(12) United States Patent
El-Gazzar et al.

(10) Patent No.: US 7,184,160 B2
(45) Date of Patent: Feb. 27, 2007

(54) SPAM FAX FILTER

(75) Inventors: Amin El-Gazzar, Key Biscayne, FL (US); Hartmut Wolf, Miami Beach, FL (US); Adrian Puente, Miami, FL (US); Alexander M. Nolasco, Hialeah Gardens, FL (US)

(73) Assignee: Venali, Inc., Coral Gables, FL (US)

( * ) Notice: Subject to any disclaimer, the term of this patent is extended or adjusted under 35 U.S.C. 154(b) by 527 days.

(21) Appl. No.: 10/637,306

(22) Filed: Aug. 8, 2003

(65) Prior Publication Data

US 2005/0030589 A1  Feb. 10, 2005

(51) Int. Cl.
*G06F 15/00* (2006.01)
*H04N 1/00* (2006.01)
*H04N 1/32* (2006.01)

(52) U.S. Cl. .................. 358/1.15; 358/402; 358/468
(58) Field of Classification Search .............. 358/1.15, 358/400, 402, 405, 406, 444, 468, 470, 465; 379/100.01
See application file for complete search history.

(56) References Cited

U.S. PATENT DOCUMENTS

| | | | | |
|---|---|---|---|---|
| 5,377,354 A | * | 12/1994 | Scannell et al. | 718/103 |
| 5,619,648 A | * | 4/1997 | Canale et al. | 709/206 |
| 5,668,897 A | * | 9/1997 | Stolfo | 382/283 |
| 5,999,600 A | | 12/1999 | Shin | 379/100.06 |
| 6,023,723 A | | 2/2000 | McCormick et al. | |
| 6,124,939 A | | 9/2000 | Toyoda et al. | |
| 6,161,130 A | * | 12/2000 | Horvitz et al. | 709/206 |
| 6,239,881 B1 | * | 5/2001 | Shaffer et al. | 358/440 |
| 6,298,370 B1 | * | 10/2001 | Tang et al. | 718/102 |
| 6,330,590 B1 | | 12/2001 | Cotton | 709/206 |
| 6,363,065 B1 | * | 3/2002 | Thornton et al. | 370/352 |
| 6,421,709 B1 | * | 7/2002 | McCormick et al. | 709/206 |
| 6,460,036 B1 | * | 10/2002 | Herz | 707/10 |
| 6,553,494 B1 | | 4/2003 | Glass | 713/186 |
| 6,584,214 B1 | | 6/2003 | Pappu et al. | 382/108 |
| 6,697,462 B2 | * | 2/2004 | Raymond | 379/93.02 |
| 6,721,059 B1 | * | 4/2004 | Sturgeon et al. | 358/1.15 |
| 6,769,016 B2 | * | 7/2004 | Rothwell et al. | 709/206 |
| 6,772,196 B1 | * | 8/2004 | Kirsch et al. | 709/206 |

(Continued)

FOREIGN PATENT DOCUMENTS

WO  WO 98/37680  *  8/1998

OTHER PUBLICATIONS

"Avoiding Spam—Fighting Back". EPCS. printed Jul. 18, 2003, from <<www.e-p-c-s.com/avoidingspam.html>>;.

(Continued)

*Primary Examiner*—Madeleine A V Nguyen
(74) *Attorney, Agent, or Firm*—Steven M. Greenberg, Esq.; Carey Rodriguez Greenberg & Paul LLP

(57) ABSTRACT

A spam fax filter which has been configured in accordance with the present invention can include a fax transformation processor configured to transform rasterized fax images into non-rasterized representations of fax images. The spam fax filter further can include a knowledge base of known spam characteristics. Finally, the spam fax filter can include a comparator configured to compare non-rasterized representations of fax images produced by the fax transformation processor to the characteristics in the knowledge base to detect spam fax in the spam fax filter.

10 Claims, 4 Drawing Sheets

U.S. PATENT DOCUMENTS

| | | | |
|---|---|---|---|
| 6,915,334 B1* | 7/2005 | Hall ........................... | 709/207 |
| 6,944,628 B1* | 9/2005 | De Breed ................. | 707/104.1 |
| 7,076,527 B2* | 7/2006 | Bellegarda et al. ......... | 709/206 |
| 7,089,241 B1* | 8/2006 | Alspector et al. .............. | 707/7 |
| 2001/0027478 A1* | 10/2001 | Meier et al. ................ | 709/206 |
| 2002/0080398 A1 | 6/2002 | Matsushima ............... | 358/1.15 |
| 2002/0080414 A1* | 6/2002 | Tanimoto .................... | 358/402 |
| 2002/0159575 A1* | 10/2002 | Skladman et al. ........ | 379/93.24 |
| 2002/0191226 A1 | 12/2002 | Huang ........................ | 358/440 |
| 2003/0050988 A1* | 3/2003 | Kucherawy ................... | 709/207 |
| 2003/0074397 A1* | 4/2003 | Morin et al. ................. | 709/203 |
| 2003/0158960 A1* | 8/2003 | Engberg ..................... | 709/237 |
| 2003/0179419 A1* | 9/2003 | Abe ........................... | 358/474 |
| 2003/0195937 A1* | 10/2003 | Kircher et al. .............. | 709/207 |
| 2004/0006747 A1* | 1/2004 | Tyler .......................... | 715/530 |
| 2004/0027605 A1* | 2/2004 | Martin ...................... | 358/1.15 |
| 2004/0054741 A1* | 3/2004 | Weatherby et al. .......... | 709/206 |
| 2004/0117648 A1* | 6/2004 | Kissel ........................ | 713/200 |
| 2004/0131190 A1* | 7/2004 | Nobel et al. ................. | 380/282 |
| 2004/0260778 A1* | 12/2004 | Banister et al. ............. | 709/206 |
| 2004/0266413 A1* | 12/2004 | Bronstein ................... | 455/415 |
| 2005/0030589 A1* | 2/2005 | El-Gazzar et al. .......... | 358/402 |
| 2005/0060638 A1* | 3/2005 | Mathew et al. ............. | 715/500 |
| 2005/0076110 A1* | 4/2005 | Mathew et al. ............. | 709/223 |
| 2005/0144238 A1* | 6/2005 | Morin et al. ................ | 709/206 |
| 2005/0172033 A1* | 8/2005 | Mathew et al. ............. | 709/246 |
| 2005/0228996 A1* | 10/2005 | Mayer ........................ | 713/170 |
| 2006/0012834 A1* | 1/2006 | Lapstun et al. ........ | 358/426.16 |

OTHER PUBLICATIONS

"Subject: New type of Spam?" Computing.Net printed Jul. 18, 2003, from <<www.computing.net/security/wwboard/forum/3237.html>>.

"ING switches to fax spam". IDG.net.nz printed Jul. 18, 2003, from <<www.computerworld.co.nz.webhome.nsf/printdoc/F1D5CB8200D23BFF3CC256BC90018DBD4!o...>>.

"Court Upholds junk fax ban, span next?" NetworkWorkFusion printed Jul. 18, 2003, from <<www.nwfusion.com/cgi-bin/mailto/x.cgi>>.

"UK companies lose £376 per employee on fax spam paper costs" Equisys Press Release dated May 29, 2003. Printed Jul. 18, 2003 from <<www.equisys.com.pressreleases_paperlessoffice.htm>>.

"GFI FAXmaker for Exchange". GFI Security and Messaging Software printed Jul. 18, 2003, from <<www.gfi.com>>.

"Fax Everywhere Service". MFM Communication Software, Inc. printed Jul. 18, 2003, from <<www.mem.com/products/ifax.html>>.

Arthur, Charles. "A Spammer in the Networks". New Scientist, Nov. 19, 1994, vol. 144. Issue 1952.

"Spam Inspector Outlook 2000/2002—Junk Mail Filter 3.1". Lencom Software, Inc. printed Aug. 3, 2003, from <<www.email-marketing-easy.com/desc/indexN3306.html>>.

* cited by examiner

SPAM FAX FILTER

BACKGROUND OF THE INVENTION

1. Statement of the Technical Field

The present invention relates to the field of facsimile devices and more particularly to processing spam facsimile images in a facsimile device.

2. Description of the Related Art

Second only to the telephone, the facsimile device remains a principal mode of commercial communications. At present, more than eighty-five million facsimile devices have been deployed worldwide and more than one and one-half billion facsimile telephone numbers have been publicly disseminated. Consequently, it should be no surprise that the direct marketing industry has incorporated the facsimile image as a means for mass broadcasting marketing messages in the same way the direct marketing industry has embraced the telephone and electronic mail as a mode of direct advertising.

Historically, the print medium served as the principal mode of unsolicited mass advertising on the part of the direct marketing industry. Typically referred to as "junk mail", unsolicited print marketing materials could be delivered in bulk to a vast selection of recipients, regardless of whether the recipients requested the marketing materials. With an average response rate of one to two percent, junk mail has been an effective tool in the generation of new sales leads. Nevertheless, recipients of junk mail generally find the practice to be annoying. Additionally, postage for sending junk mail can be expensive for significant "mail drops". Consequently, the direct marketing industry constantly seeks equally effective, but less expensive modalities for delivering unsolicited marketing materials.

The advent of electronic mail has provided much needed relief for direct marketers as the delivery of electronic mail to a vast number of targeted recipients requires no postage. Moreover, the delivery of unsolicited electronic mail can be an instantaneous exercise and the unsolicited electronic mail can include embedded hyperlinks to product or service information thus facilitating an enhanced response rate for the "mail drop". Still, as is the case in the realm of print media, unsolicited electronic mail, referred to commonly as "spam", remains an annoyance to consumers worldwide. As a result, an entire cottage industry of "spam filters" has arisen whose task solely is the eradication of spam.

Like electronic mail, the facsimile medium remains a popular medium for broadcast marketing. Unlike electronic mail, however, there is a real cost to the consumer for receiving spam in the facsimile medium. In particular, a single spam facsimile image can consume paper and toner resource and can consume telecommunications bandwidth which otherwise can be used for sending outgoing facsimiles, or to received legitimate incoming facsimiles. In the United Kingdom, it is estimated that spam in the facsimile domain costs each British company in excess of three-hundred and seventy six pounds annually. In the United States, some estimates place the cost of spam in the facsimile domain at as high as nine-billion dollars per year! So serious and hotly contested has the topic spam fax become, that the State of Missouri successfully sued two of the largest spam faxing organizations under section 227 of the Telephone Consumer Protection Act of 1991 (hereinafter "TCPA") which suit had been supported by the States of Alaska, Arkansas, California, Colorado, Connecticut, Florida, Idaho, Illinois, Iowa, Kentucky, Maryland, Michigan, Minnesota, New Mexico, Oregon, South Dakota, Texas, Vermont, West Virginia and the District of Columbia. Notably, section 227 of the TCPA makes it unlawful "to send an unsolicited advertisement to a telephone facsimile machine".

Nevertheless, the outcome of the suit has yet to be resolved and the defendants in suit have called into question the constitutionality of the TCPA in view of commercial free speech protections afforded by the United States Constitution. Additionally, the application of section 227 of the TCPA to Internet fax communications further remains unsettled. In particular, no longer is it required that two telephone facsimile machines coexist to exchange facsimile data. In fact, ITU-T recommendation T.37 specifies the transmission of a facsimile image via the Internet in the absence of telephone facsimile machines.

Notably, spam filters while effective in the electronic mail domain, have no application in the facsimile domain. In particular, electronic mail differs from facsimile images in several distinct and important ways. Most notably, electronic mail can be delivered in a text readable format—typically the MIME format. As a result, spam filters can act directly upon the nature, content and arrangement of text in electronic mail. More particularly, the spam filter can seek out the occurrence of particular words which can indicate the presence of spam. Facsimile images, by comparison, are delivered in rasterized image format whose contents cannot be interpreted beyond mere black and white or color pixels. Thus, electronic mail spam filtering techniques remain ineffective in the facsimile domain and other solutions have been considered alternatively.

Several technologies, though not addressing spam directly, may be viewed as providing rudimentary solutions to the spam fax problem. For instance, in U.S. Pat. No. 5,999,600 to Dong-Myong Shin for FACSIMILE MAIL SYSTEM AND METHOD FOR CONTROLLING THE SAME, a password supplied through DTMF signals can restrict the delivery of a "literal message" where the password provided through DTMF signals does not match a pre-stored password. As another example, in United States Patent Application Publication US 2002/0191226 A1 for CALL-SCREENING DEVICE FOR A FACSIMILE MACHINE, the telephone number of the incoming call can be compared to a database of telephone numbers to determine whether to permit the establishment of a telephonic connection upon which the transmission of fax data can be provided. Interestingly, in U.S. Pat. No. 6,553,494 B1 to Randal Glass for METHOD AND APPARATUS FOR APPLYING AND VERIFYING A BIOMETRIC-BASED DIGITAL SIGNATURE TO AN ELECTRONIC DOCUMENT, biometric data coupled to a document can be used to authenticate the document by a recipient.

In more particular reference to the facsimile domain, several fax specific anti-spam technologies have been marketed. As an example, GFi Software Ltd. has developed the GFI FAXmaker™ line of products in which faxes can be sent and received through ordinary electronic mail clients. As part of the GFI FAXmaker product, a "junk fax filter" is provided through which spam faxes can be "auto-deleted" on the basis of the phone number of the sender of the junk fax. Specifically, a database of phone numbers associated with the sender of a fax identified manually as a junk fax can be used to screen subsequently received faxes.

By comparison, MFM Communication Software, Inc. of Cincinnati, Ohio, United States produces the Fax Everywhere™ product in which manually identified junk faxes can be tagged as "spam". Once tagged, the contents of the tagged fax can be compared to subsequently received faxes to recognize spam. Where ninety-five percent (95%) of the received fax matches a rasterized image of a stored fax tagged as spam, the received fax can be declared as spam. Thus, the Fax Everywhere product can be viewed as a manually assisted spam fax detection processor which lacks self-learning or pre-emptive spam screening capabilities.

Still, merely comparing a facsimile image to an image stored in a repository of spam fax images can be a resource intensive and time consuming process. More importantly, in a spam detection and blocking system in which spam must be manually identified, the "damage" will have been "done" once the spam has been manually recognized as such—particularly in a high-volume fax environment where a single instance of broadcast spam fax can reach thousands of end users in a single "drop". Accordingly, it would desirable to dynamically detect spam fax in a self-learning manner without requiring manual intervention.

SUMMARY OF THE INVENTION

The present invention addresses the deficiencies of the art in respect to the transmission of unsolicited facsimile images (hereinafter "spam fax") in the facsimile domain, and provides a novel and non-obvious method, system and apparatus for filtering spam fax so as to identify a fax image as spam fax automatically upon detecting an attempt to transmit spam fax to a fax output device. Importantly, unlike conventional spam fax reduction and elimination technologies known in the art, in the present invention, rasterized forms of fax imagery are not processed directly to detect spam fax. Rather, the rasterized form of the fax imagery can be transformed into a non-rasterized representation so as to facilitate the detection of spam fax without consuming unnecessary system resources and without undertaking time consuming pixel comparisons as is the case in the prior art. Most importantly, the present invention is a dynamic, self-learning system which does not require the advance, manual labeling of spam to avoid the debilitative effect of a spam fax drop.

A spam fax filter which has been configured in accordance with the present invention can include a fax transformation processor configured to transform rasterized fax images into non-rasterized representations of fax images. Non-rasterized representations can include numerical based, textual based, vector based or other such data representation of an image, including a number of pages forming a fax image, a number of black and white pixels forming a fax image, or the intensity of a fax image. The spam fax filter further can include a knowledge base of fax characteristics including characteristics of spam faxes, and characteristics of faxes which are not spam. Finally, the spam fax filter can include a comparator configured to compare non-rasterized representations of fax images produced by the fax transformation processor with the characteristics in the knowledge base to detect spam fax in the spam fax filter.

Notably, the spam fax filter optionally can include an optical character recognition (OCR) processor coupled to the fax transformation processor. The OCR processor can be configured to convert the rasterized fax images into textual representations of the rasterized fax images. The spam fax filter further can optionally include an edge sharpening filter coupled to the fax transformation processor. The edge sharpening filter can be configured to produce intermediate imagery for the rasterized fax images having accentuated edges defining the rasterized fax image. Consequently, a set of vectors can be computed for the accentuated edges in the intermediate imagery.

As yet a further option, the spam fax filter can include a blurring filter coupled to the fax transformation processor; and, a robust hash processor configured to produce a robust hash value for a blurred form of the rasterized fax image. Finally, the spam fax filter optionally can include means for detecting a color value for a selection of pixels in a region of the rasterized fax images. Based upon the detected color values, the transformation processor can numerically encode each of the rasterized fax images with at least one numerical value accounting for a number of black pixels for a single rasterized fax image and a number of white pixels in the single rasterized fax images.

A method for filtering spam fax can include transforming a rasterized form of a candidate fax image into one or more non-rasterized forms; testing the non-rasterized form of the candidate fax image against fax characteristics such as spam fax characteristics, or characteristics of fax images known not to be spam; and, identifying the candidate fax image as spam fax where the candidate fax image tests favorably to at least one of the characteristics of the known spam fax. In this regard, where a transformation of a fax image demonstrates one or more of the characteristics of a spam beyond a threshold level, the fax image can be declared spam. Similarly, where a transformation of a fax image demonstrates one or more of the characteristics of non-spam beyond a threshold level, the fax image can be declared non-spam.

The transforming step can include the step of processing the candidate fax image in an optical character recognition processor to convert the candidate fax image into a text. Alternatively, the transforming step can include the steps of accentuating edges in the candidate fax image; and, computing a set of vectors for the accentuated edges. As another alternative, the transforming step can include both blurring the candidate fax image; and, producing a robust hash value for the blurred candidate fax image. Finally, as yet another alternative, the transforming step can include detecting a color value for a selection of pixels in a region of the candidate fax image. The candidate fax image subsequently can be numerically encoded with at least one numerical value accounting for a number of black pixels and a number of white pixels in the candidate fax image.

Importantly, the testing step can include the step of apply the characteristics of to the transformation to produce a result. Specifically, the transformation can be compared to selected ones of the characteristics to determine whether the transformation meets a threshold level of the characteristic criteria. Each comparison can produce a score. When the score exceeds a corresponding one of the threshold values, the score can be weighted and the weighted scores for the comparisons can be summed. The sum can produce the ultimate result for determining whether the candidate fax image is a legitimate fax or a spam fax.

Significantly, by producing an in-line, dynamic decision for whether a candidate image is spam fax or legitimate, the costly impact of a spam fax drop can be avoided because the present invention is predictive in nature. Additionally, because in the present invention, non-rasterized representations of fax image are used to process the spam fax determination in lieu of a rasterized form of the fax image, delays and the excessive consumption of computing resources can be avoided. Finally, because the present invention incorporates a knowledge base of characteristics with which spam fax can be identified, the invention can be self-learning in that the characteristics of identified spam fax can be used to tune and refine the contents of the knowledge base.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a spam fax filter system, method and apparatus. In accordance with the inventive arrangements, a spam fax filter can process candidate fax imagery through a comparison of non-rasterized transformative representations of the candidate imagery with a knowledge base of known fax characteristics. Where the transformation of the candidate fax imagery sufficiently demonstrates the fax characteristics stored in the knowledge base to indicate that the fax is spam, the candidate fax can be declared spam and the candidate fax can be handled accordingly. In addition, the knowledge base can be tuned with the additional data points provided by the candidate imagery. Otherwise, where the candidate fax imagery does not sufficiently demonstrate spam characteristics stored in the knowledge base, the candidate fax can be declared legitimate and the candidate fax can be processed accordingly.

Figure 1:
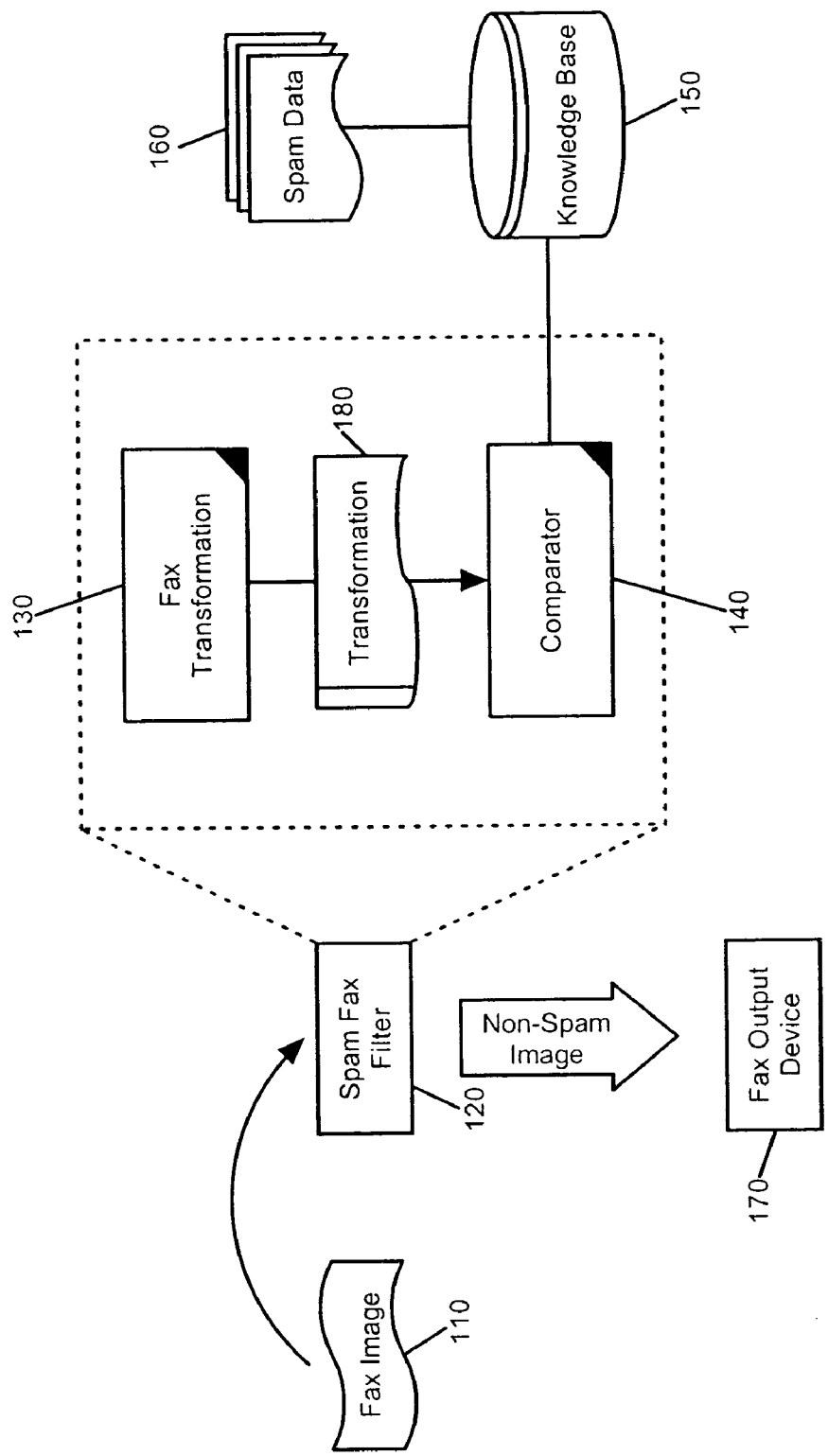
FIG. 1 is schematic illustration of a spam fax filter which has been configured in accordance with the inventive arrangements.

FIG. 1 is schematic illustration of a spam fax filter 120 which has been configured in accordance with the inventive arrangements. The spam fax filter 120 can be coupled to a fax output device 170 and can include both a fax transformation processor 130 and a comparator 140. The comparator 140 can be coupled to a spam knowledge base 150 which can store data sets of known fax characteristics 160. Known fax characteristics 160 can include one or both of spam fax characteristics and non-spam fax characteristics. Spam fax characteristics can include non-rasterized data regarding the characteristics of spam, such as typical page lengths of a fax transmission, color intensities, common patterns within the fax transmission, and the like. Likewise, non-spam fax characteristics can include non-rasterized data regarding the characteristics of legitimate faxes, such as typical page lengths of a fax transmission, color intensities, common patterns within the fax transmission, and the like.

Returning now to FIG. 1, a rasterized fax image 110 can be received in the spam fax filter 120. By rasterized, it will be well understood by the skilled artisan that fax imagery can include a raster representation typically stored in one of several standardized formats, for example the TIFF format, the JBIG format and the JPEG format, to name a few. The fax image 110 can be converted in the fax transformation processor 130 to one or more non-rasterized representations of the fax image 110, referred to herein as the transformation 180, such as a set of vectors defining the fax image 110. Alternatively, the fax transformation processor 130 can reduce the rasterized form of the fax image 110 to an encoded numerical representation or a numerical robust hash. Yet further alternatively, the fax transformation processor 130 can convert the rasterized form of the fax image 110 to a textual form through an optical character recognition process.

In any case, once the fax transformation processor 130 has produced one or more of the non-rasterized transformations 180 of the fax image, the produced transformations 180 can be processed in the comparator 140. In particular, the comparator 140 can compare one of the transformations 180 to the sets of known spam characteristics 160 stored in the knowledge base 150. Where the transformed fax image 180 demonstrates one or more of the sets of spam characteristics 160 in the knowledge base 150, the fax image 110 can be identified as an instance of spam fax and handled accordingly, for instance discarded, quarantined, etc. Otherwise, the spam fax filter 120 can permit the further fax output processing of the fax image 110 through a fax output device 170 such as a fax printer, or a fax router. Importantly, where the fax image 110 is identified as spam, the characteristics of the fax image 110 can be accounted for in the knowledge base 150 to further refine and tune the sets of known spam characteristics 160.

Figure 2:
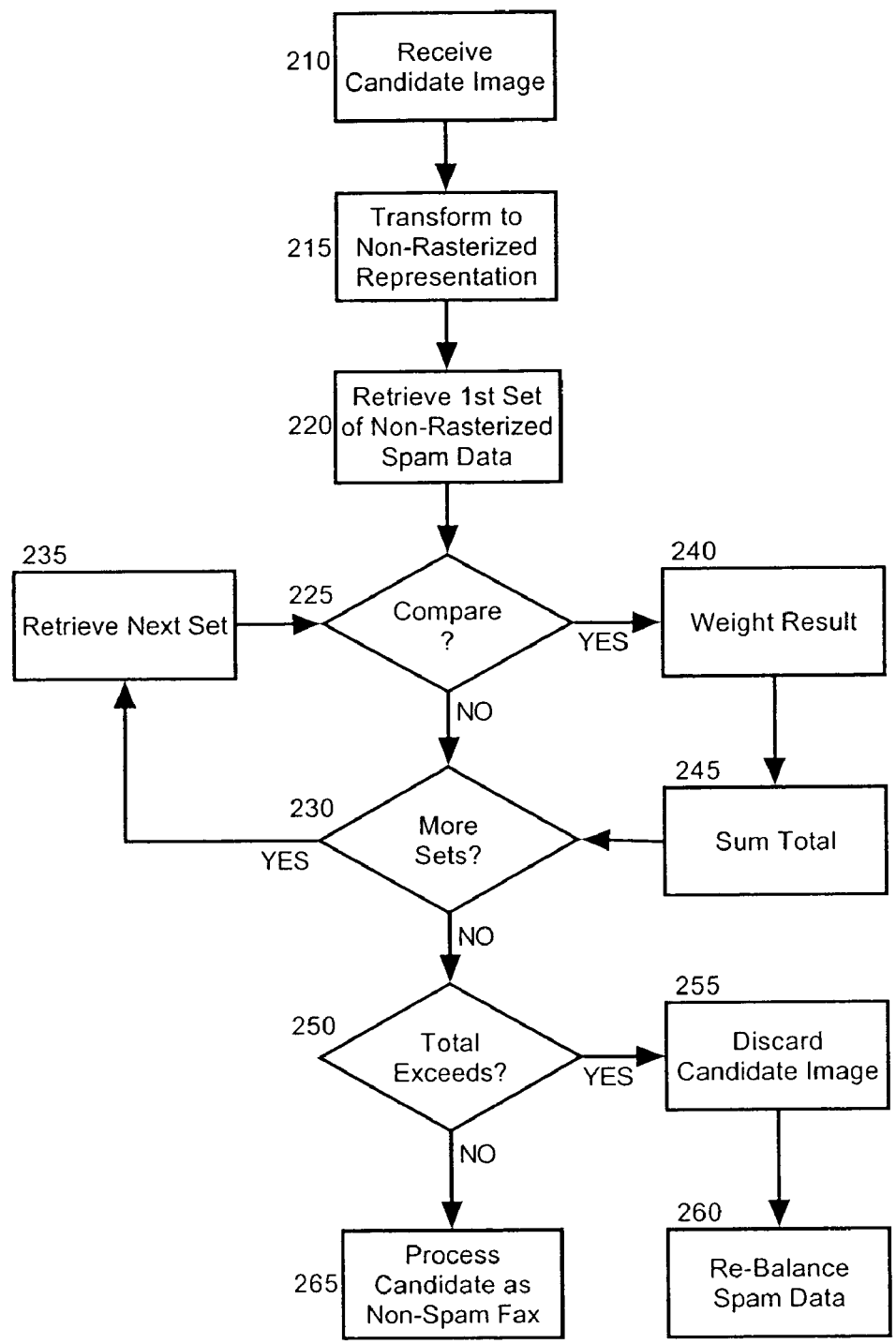
FIG. 2 is a flow chart illustrating a process for filtering spam in the spam fax filter of FIG. 1.

In more particular illustration, FIG. 2 is a flow chart illustrating a process for filtering spam facsimile images in the spam fax filter of FIG. 1. Beginning in block 210, the candidate rasterized fax image can be received for processing. In block 215, the candidate image can be transformed to a non-rasterized representation. The transformation process of block 215 need not be limited to any one type of reduction. In this regard, FIG. 4 is a block diagram illustrating multiple preferred configurations for the fax image transformation processor of FIG. 1.

Figure 4:
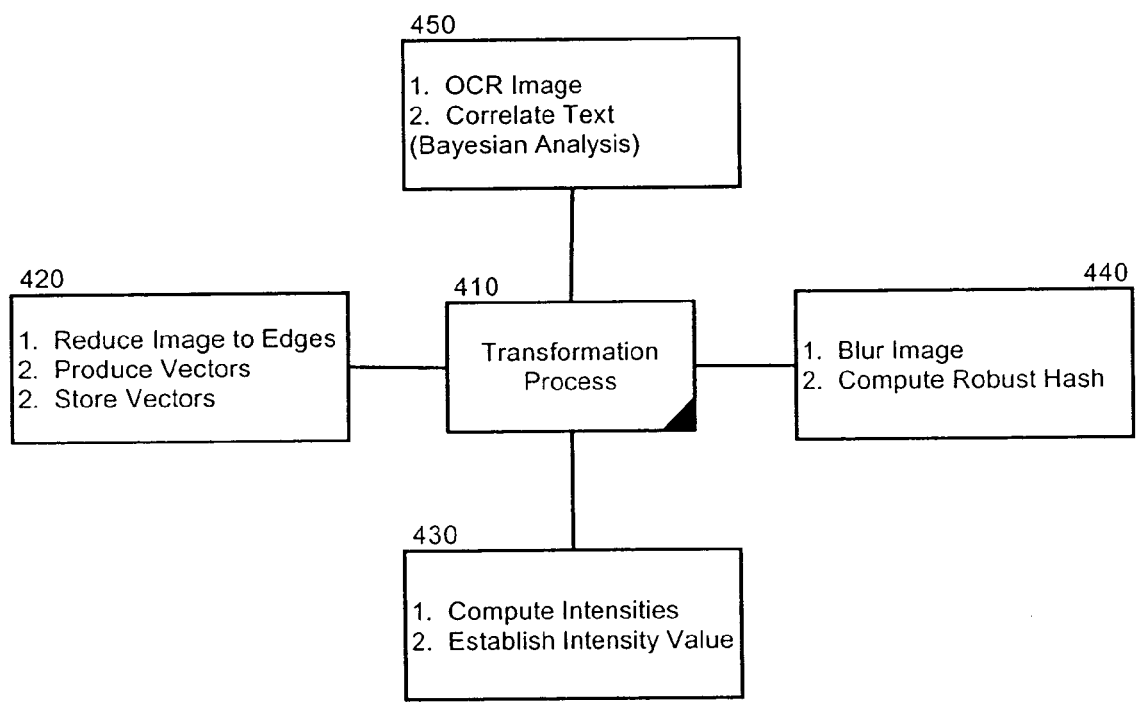

As shown in FIG. 4, the transformation process 410 can produce a non-rasterized form of the fax image through the use of at least one of four illustrated methodologies though the illustrated methodologies by no means represent the exclusive universe of methodologies for producing a reduced, non-rasterized form of a fax image. Rather, it will be recognized by the artisan skilled in the art of image processing, that several techniques exist for converting a generalized raster image to a non-raster image. In the present invention as illustrated in FIG. 4, four such exemplary methodologies are shown.

In one aspect of the present invention shown in block 420, an edge sharpening filter can be applied to the rasterized image to produce an intermediate image having accentuated edges defining the original fax image. Vectors can be produced for the edges and the resulting set of vectors can be stored as a unique representation of the rasterized image. Alternatively, in block 430 the relative color intensities of the rasterized image can be computed to numerically encode the rasterized image with a unique intensity vector. For example, the number of white and black pixels can be enumerated in the fax image, or the ratio of white to black pixels in a region of the rasterized image can be computed to produce a unique intensity ratio for the region. The rasterized image, itself, can be subdivided into one or more regions, the skilled artisan noting that having more regions can produce a higher likelihood of generating a unique intensity ratio, while correspondingly increasing the processing required to compute the relative intensities for the numerous regions.

As yet a third alternative, in block 440, the rasterized image can be blurred by passing the rasterized image through a blurring filter. Subsequently, a robust hash such as the well-known MD-5 hash can be applied to the blurred image to produce a unique hash value for the image. Finally, in block 450, the image can be processed through OCR to generate a set of textual words and symbols. The symbols can be pre-processed for inter-symbol correlations such as through a Bayesian analysis. In such a case, when comparing the textual representation of the image to another similarly transformed image, a match can be presumed where identical correlations subsist in both transformed images.

Returning now to FIG. 2, once the candidate fax image has been transformed to a non-rasterized form, in block 220 a first set of known spam characteristics can be retrieved, such as typical color intensities or patterns, typical image vectors within a spam fax image, a certain appearance of words or combinations of words, a typical number of pages in a fax transmission, etc. In decision block 225, the transformed representation can be compared to the first set of spam characteristics to determine whether the candidate image demonstrates the characteristics defined by the first set. If so, in block 240 result can be weighted to indicate a relative importance of the set. In block 245, a sum total score can be summed with the weighted score for the set and the process can continue through decision block 230.

In decision block 230, if more sets of spam characteristics remain to be tested in the candidate image, in block 235 the next set of spam characteristics can be retrieved and the process can be repeated in blocks 225 through 245. Once no more sets of spam characteristics remain to be applied, in decision block 250 it can be determined whether the sum total score exceeds a threshold value. If not, in block 265 the candidate image can be processed as a permissible fax transmission. Otherwise, if the sum total score exceeds the threshold value, the candidate image can be labeled as spam fax and discarded in block 255. Additionally, in block 260 the set of spam characteristics in the knowledge base can be re-tuned with the non-rasterized image data present in the candidate fax.

Figure 3:
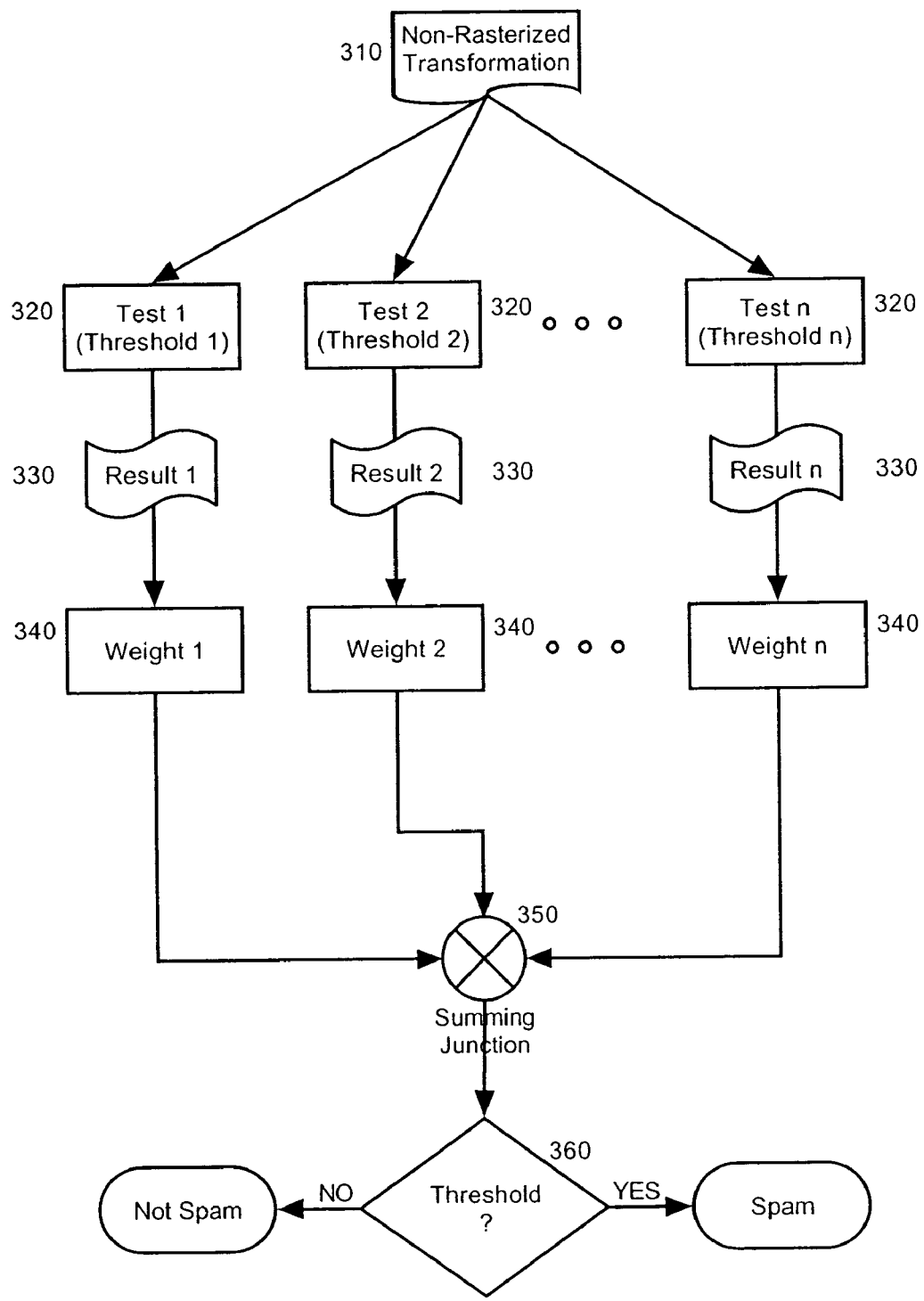
FIG. 3 is a block diagram illustrating a process for testing candidate fax imagery against a knowledge base of known spam fax characteristics; and, FIG. 4 is a block diagram illustrating multiple preferred configurations for the fax image transformation processor of FIG. 1.

Importantly, the determination of whether a candidate image is spam can be performed through a user-configurable weighting of different characteristics of spam as defined within the knowledge base. To that end, FIG. 3 is a block diagram illustrating the process for identifying probable spam. As shown in FIG. 3, a non-rasterized transformation 310 of a candidate fax image can be concurrently processed in one or more spam tests 320. Each individual spam test 320 can apply a set of spam characteristics to the non-rasterized transformation to determine whether the non-rasterized transformation demonstrates the test characteristic to within a user configurable threshold value. As an example, an exemplary test can include the number of pages within the fax transmission. Where the page count exceeds five pages, it can be concluded that the candidate fax meets the criteria for the exemplary test.

It will be recognized by the skilled artisan, that not all spam tests 320 will be considered equally in the sum total evaluation of whether a candidate fax image is a spam fax. Accordingly, each of the results 330 can be weighted 340 according to the importance of the spam test 320. The weighted sum 350 can be evaluated against a threshold 350 to determine whether the candidate image is spam fax or a legitimate fax.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A spam fax filter comprising:
   a fax transformation processor configured to transform rasterized fax images into non-rasterized representations of fax images;
   a knowledge base of fax characteristics comprising at least one fax characteristic selected from the group consisting of spam characteristics and non-spam characteristics; and,
   a comparator configured to compare non-rasterized representations of fax images produced by said fax transformation processor with at least one of said fax characteristics to detect spam fax in the spam fax filter;
   wherein said knowledge base comprises fax characteristics selected from the group consisting of a number of fax transmission pages, fax image intensity, and fax image patterns.

2. A spam fax filter comprising:
   a fax transformation processor configured to transform rasterized fax images Into non-rasterized representations of fax images;
   a knowledge base of fax characteristics comprising at least one fax characteristic selected from the group consisting of spam characteristics and non-spam characteristics;
   a comparator configured to compare non-rasterized representations of fax images produced by said fax transformation processor with at least one of said fax characteristics to detect spam fax in the spam fax filter;
   an edge sharpening filter coupled to said fax transformation processor and configured to produce intermediate imagery for said rasterized fax images comprising an image having accentuated edges defining said rasterized fax image; and, means for computing a set of vectors for said accentuated edges in said intermediate imagery.

3. A spam fax filter comprising:

a fax transformation processor configured to transform rasterized fax images into non-rasterized representations of fax images;

a knowledge base of fax characteristics comprising at least one fax characteristic selected from the group consisting of spam characteristics and non-spam characteristics;

a comparator configured to compare non-rasterized representations of fax images produced by said fax transformation processor with at least one of said fax characteristics to detect spam fax in the spam fax filter;

a blurring filter coupled to said fax transformation processor; and, a robust hash processor configured to produce a robust hash value for a blurred form of said rasterized fax image.

4. A spam fax filter comprising:

a fax transformation processor configured to transform rasterized fax images into non-rasterized representations of fax images;

a knowledge base of fax characteristics comprising at least one fax characteristic selected from the group consisting of spam characteristics and non-spam characteristics;

a comparator configured to compare non-rasterized representations of fax images produced by said fax transformation processor with at least one of said fax characteristics to detect spam fax in the spam fax filter;

means for detecting a color value for a selection of pixels in a region of said rasterized fax images; and, means for numerically encoding each of said rasterized fax images with at least one numerical value accounting for a number of black pixels for a single rasterized fax image and a number of white pixels in said single rasterized fax images.

5. A method for filtering spam fax, the method comprising the steps of;

transforming a rasterized form of a candidate fax image into a non-rasterized form;

testing said non-rasterized form of said candidate fax image against at least one fax characteristic selected from the group consisting of spam characteristics and non-spam characteristics; and, identifying said candidate fax image as spam fax where said candidate fax image tests favorably against at least one of said fax characteristics, wherein said transforming step comprises the steps of:
accentuating edges in said candidate fax image; and,
computing a set of vectors for said accentuated edges.

6. A method for filtering spam fax, the method comprising the steps of:

transforming a rasterized form of a candidate fax image into a non-rasterized form;

testing said non-rasterized form of said candidate fax image against at least one fax characteristic selected from the group consisting of spam characteristics and non-spam characteristics; and, identifying said candidate fax image as spam fax where said candidate fax image tests favorably against at least one of said fax characteristics, wherein said transforming step comprises the steps of:
blurring said candidate fax image; and,
producing a robust hash value for said blurred candidate fax image.

7. A method for filtering spam fax, the method comprising the steps of:

transforming a rasterized form of a candidate fax image into a non-rasterized form;

testing said non-rasterized form of said candidate fax image against at least one fax characteristic selected from the group consisting of spam characteristics and non-spam characteristics; and, identifying said candidate fax image as spam fax where said candidate fax image tests favorably against at least one of said fax characteristics, wherein said transforming step comprises the steps of:
detecting a color value for a selection of pixels in a region of said candidate fax image; and,
numerically encoding said candidate fax image with at least one numerical value accounting for a number of black pixels and a number of white pixels in said candidate fax image.

8. A machine readable storage having stored thereon a computer program for filtering spam fax, the computer program comprising a routine set of instructions for causing the machine to perform the steps of:

transforming a rasterized form of a candidate fax image into a non-rasterized form;

testing said non-rasterized form of said candidate fax image against at least one fax characteristic selected from the group consisting of spam characteristics and non-spam characteristics; and, identifying said candidate fax image as spam fax where said candidate fax image tests favorably against at least one of said fax characteristics, wherein said transforming step comprises the steps of:
accentuating edges in said candidate fax image; and,
computing a set of vectors for said accentuated edges.

9. A machine readable storage having stored thereon a computer program for filtering spam fax, the computer program comprising a routine set of instructions for causing the machine to perform the steps of:

transforming a rasterized form of a candidate fax image into a non-rasterized form;

testing said non-rasterized form of said candidate fax image against at least one fax characteristic selected from the group consisting of spam characteristics and non-spam characteristics; and, identifying said candidate fax image as spam fax where said candidate fax image tests favorably against at least one of said fax characteristics, wherein said transforming step comprises the steps of:
blurring said candidate fax image; and,
producing a robust hash value for said blurred candidate fax image.

10. A machine readable storage having stored thereon a computer program for filtering spam fax, the computer program comprising a routine set of instructions for causing the machine to perform the steps of:

transforming a rasterized form of a candidate fax image into a non-rasterized form;

testing said non-rasterized form of said candidate fax image against at least one fax characteristic selected from the group consisting of spam characteristics and non-spam characteristics; and, identifying said candidate fax image as spam fax where said candidate fax image tests favorably against at least one of said fax characteristics,
wherein said transforming step comprises the steps of:
detecting a color value for a selection of pixels in a region of said candidate fax image; and,
numerically encoding said candidate fax image with at least one numerical value accounting for a number of black pixels and a number of white pixels in said candidate fax image.

* * * * *